United States Patent [19]
McKinnon

[11] Patent Number: 4,721,634
[45] Date of Patent: Jan. 26, 1988

[54] SIMULATED MARBLE

[76] Inventor: Gordon McKinnon, 190 Blanca, Tampa, Fla. 33606

[21] Appl. No.: 861,233

[22] Filed: May 7, 1986

[51] Int. Cl.$^4$ .......................... B05D 3/12; B05D 5/02; B05D 1/36
[52] U.S. Cl. .................................... 427/263; 427/264; 427/265; 427/268; 427/270; 427/309
[58] Field of Search .............. 427/263, 264, 265, 268, 427/270, 309

[56] References Cited

U.S. PATENT DOCUMENTS 3,341,396 9/1967 Iverson ........................... 427/268 X
3,712,825 1/1973 Yocum ................................ 427/264

Primary Examiner—Evan K. Lawrence
Attorney, Agent, or Firm—Frijouf, Rust & Pyle

[57] ABSTRACT

A process for covering a substrate with a textured simulated marble surface by mixing cement and sand to form a first mixture to which is added an aqueous solution of acrylic resin to create a first mortar. The cement and sand are mixed to form a second mixture to which is added an aqueous solution of acrylic resin to create a second mortar. A contrasting pigment is added to one of the first and second mortars. The first mortar is applied over the entire substrate. The second mortar is applied onto randomly spaced portions over the previously applied first mortar prior to the complete curing of the first mortar to form a unitary textured covering. The textured unitary coating includes a lower layer and an upper layer with the upper layer comprising the second mortar and the lower layer comprising the first and second mortar. The contrasting pigment in the one of the first and second mortars is allowed to commingle with the other of the first and second mortars to enable the pigmented areas to blend with the non-pigmented areas. Lightly troweling substantially only the blended upper layer of the unitary textured covering of the substrate to simulate a marble surface.

11 Claims, 5 Drawing Figures

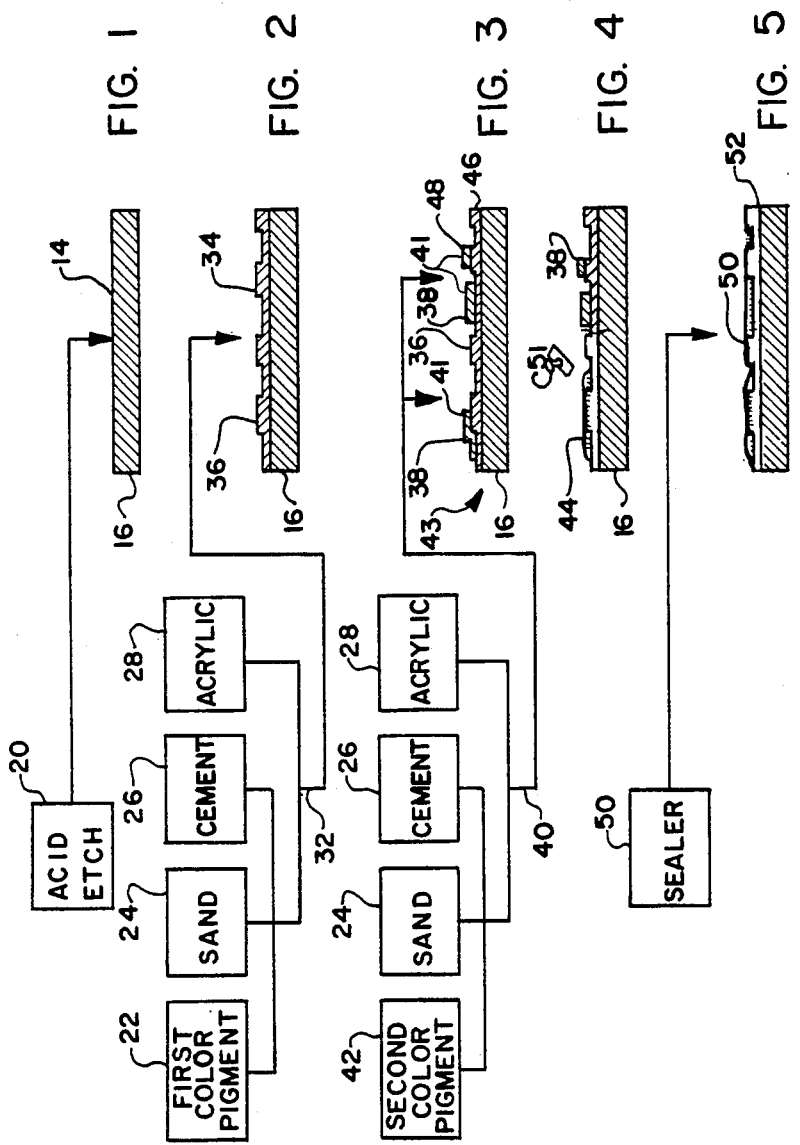

SIMULATED MARBLE

BACKGROUND OF THE INVENTION

1. Field of the Invention

This invention relates to simulated marble, and more particularly to making a textured simulated marble surface on existing or new substrates such as flooring, driveways, patios, pool decking, decorative walls and the like.

2. Description of the Prior Art

Various methods have been devised by the prior art for producing simulated brick, tile and the like. One method of producing simulated bricks or tiles, for example, involves preparing a mixture of cement, water and water-based adhesives having a consistency of mortar which is applied to a wall or floor then allowed to partially set. Scoring indentations are made to remove cement after which mortar is placed in the indentations produce the desired simulated brick appearance.

A popular method of coating concrete driveways, pool decks, walls and the like involves coating the surface with a color or pigment composition. These compositions are available as cement water paint, alkyd-type enamel, resin-emulsion paint, oil paint, rubber-base paint, polyvinyl acetate emulsions, polyester paint, epoxy paint and silicon sealers. These compositions, however, do not produce a simulated textured marble surface.

Another method of color enhancing concrete involves mixing color pigments, either natural or synthetic, into the dry cement powder before-hand or by dusting it on afterward. When the color pigment is added to the dry cement mix, the color pigment is preferably put through a sieve to insure even blending. If the surface is not too large such that the mortar will set before finishing, the color pigment may be applied by "dusting" the color pigment onto the concrete slab after floating. Here the pigment is mixed with fine sand and scrubbed into the wet surface with a stiff brush and smooth troweled. These methods sometime result in an uneven or blotchy color and/or a color which looks faded in dry weather. These compositions, also fail to produce a simulated textured marble surface.

Therefore, it is an object of this invention to provide an economical process of preparing a durable simulated marble surface.

Another object of this invention is to provide a process of preparing a simulated marble surface which provides a tough surface which hardens to a marble-like surface suitable for heavy pedestrian traffic.

Another object of this invention is to provide a process of preparing a simulated marble surface with provides excellent adhesion to the substrate.

Another object of this invention is to provide a process of preparing a simulated marble surface which is skid resistant.

Another object of this invention is to provide a process of preparing a simulated marble surface which illustrates the intermix of contrasting and background colors suggestive of marble.

Another object of this invention is to provide a process of preparing simulated marble surface where selection of the intermixed colors is a matter of choice.

Another object of this invention is to provide a process of preparing simulated marble surface which is structurally durable for surfacing driveways, pool decks and the like.

Another object of this invention is to provide a process of preparing simulated marble surface that may be applied to new or existing substrates to produce a simulated marble appearance.

Another object of this invention is to provide a process of preparing a simulated marble surface which is textured in appearance.

The foregoing has outlined some of the more pertinent objects of the invention. These objects should be construed to be merely illustrative of some of the more prominent features and applications of the invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiments in addition to the scope of the invention which is defined by the claims taken in conjunction with the accompanying drawings.

SUMMARY OF THE INVENTION

The invention is defined by the appended claims with a specific embodiment shown in the attached drawings. For purposes of summarizing the invention, the invention may be incorporated into a process of preparing a simulated marble surface. The process for covering a substrate with a simulated marble surface comprises mixing cement and sand to form a first mixture to which is added an aqueous solution of an acrylic resin to create a first liquid mortar. Cement and sand are mixed to form a second mixture to which is added an aqueous solution of acrylic resin to create a second liquid mortar. A contrasting pigment is added to and evenly mixed and dispersed throughout one of the first and second liquid mortars. The first liquid mortar is applied to the substrate to form a first textured coat on the substrate. The second liquid mortar is applied onto randomly spaced portions of the first coating prior to the complete curing of the first coating enabling the first and second coatings to form a unitary textured covering for the substrate with the contrasting pigment being randomly spaced in the textured unitary covering. The textured unitary coating has a lower layer and an upper layer with the upper layer comprising the second liquid mortar and the lower layer comprising the first and second liquid mortar. The contrasting pigment in the one of the first and second liquid mortars is allowed to commingle with the other of the first and second liquid mortars to enable the pigmented areas to blend with the non-pigmented areas. Lightly troweling substantially only the blended upper layer of the unitary textured covering of the substrate to simulate a marble surface.

In a further embodiment of the invention the first and second mortars are of a viscosity capable of being sprayed through a spray gun to enable the first and second mixtures to be applied by spraying. Preferably, each first and second mortars are applied by spraying using a spray texture gun such as a Kraft Texture Gun which mixes the mortar and air to produce a textured surface by spraying. Preferably, the first mortar is sprayed through a small bore air tip to provide a fine textured appearance and the second mortar is sprayed through a larger bore air tip to provide a coarse textured appearance. Preferably, the small bore air tip has a diameter of 3/32 of an inch and the large bore air tip has a diameter of ⅛ of an inch. The first liquid mortar is applied at about 15 pounds per square inch and the second liquid mortar is applied at about 20 to 22 pounds per square inch. The higher pressure for the second liquid mortar insures better color penetration or commingling or blending.

An optional protective clear coating may be applied to the simulated marble surface to prevent premature aging of the simulated marble surface. Generally, the clear coating includes sun screens to protect against color fading and sealants to provide water resistance to the simulated marble surface. The clear coating is selected from acrylic, epoxide, or polyurethane and the like based coatings containing sun screens and sealants known in the art. The application of a clear coating to the surface provides protection to the simulated marble surface without interfering with the inherent skid resistance of the simulated marble surface. Skid resistance is desired in an outdoor or wet location. Application of a large number of clear coats tends to level the surface of the simulated marble and to reduce the skid resistance of the simulated marble surface.

The preferred substrate is concrete. However, where the concrete surface is older than about 24 hours from the time the substrate concrete was poured, the substrate concrete must be acid-etched prior to applying the first liquid mortar. This insures a bonding between the concrete and the first liquid mortar of the lower layer. The preferred acid to degrease and etch concrete is hydrofluoric acid.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 schematically illustrates the acid etching of the substrate prior to applying the simulated marble surface;

FIG. 2 schematically illustrates the application of the first liquid mortar onto the acid etched surface of FIG. 1;

FIG. 3 schematically illustrates the application of the second liquid mortar onto the surface of the first liquid mortar as illustratively applied at FIG. 2;

FIG. 4 schematically illustrates the first and second liquid mortar coats being troweled; and FIG. 5 schematically illustrates the application of a sealant onto the coated surface of FIG. 4.

Similar reference characters refer to similar parts throughout the several views of the drawings.

DETAILED DESCRIPTION

The present invention discloses a process which is suitable for applying over new or existing substrates a new surface which simulates a marble appearance.

FIG. 1 schematically illustrates the application of the acid-etch composition 20 onto the surface 14 of a concrete substrate 16. The acid-etch composition comprises an aqueous solution of hydrofluoric acid which is used to degrease and otherwise prepare the concrete substrate to accept and bond the first liquid mortar.

FIG. 2 schematically illustrates the components of the first mixture namely, sand 24, cement 26 and optionally a first color pigment 22. To this mixture is added an aqueous solution of an acrylic resin 28 to prepare a first liquid mortar 32. The mortar is preferably sprayed onto the previously acid-etched surface 14 set forth at FIG. 1. The first liquid mortar is sprayed such that the resultant surface appearance is textured in character 34 forming a first coat 36.

FIG. 3 is a schematic illustration of the application of the second liquid mortar 40 onto the surface of FIG. 2 which illustrates the previously applied first liquid mortar 34. The second liquid mortar contains the same components of the first liquid mortar 32 and optionally a contrasting color pigment 42. The second liquid mortar 40 is applied to randomly spaced portions 41 of the first coating 36 prior to the compete curing of the first coating to form a second coating 38. This enables the first and second coatings to form a unitary textured coating 43 covering for the substrate with the contrasting pigment being randomly spaced in the textured unitary covering. As illustrated in FIG. 3, the textured unitary coating forms an upper layer 48 and a lower layer 46. The lower layer 46 comprises the first 32 and second 40 liquid mortars and the upper layer comprises the second liquid mortar 40. Portions of the second liquid mortar 40 fall into the lower layer 46 as well as comprise the upper layer 48. The thickness of the first and second coating together ranges from about ⅛" to ¼", with each coat having essentially the same thickness.

FIG. 4 schematically illustrates the contrasting pigment 44 in the one of the first 32 and second 40 liquid mortars commingling with the other of the first and second liquid mortars to enable the pigmented areas to blend with the non-pigmented areas. A trowel 51 is illustrated troweling substantially only the upper layer 48 to result in a textured simulated marble surface.

FIG. 5 schematically illustrates the application of a sealer 50 to the cured surface 52. The sealer protects the secured simulated marble surface by including sunscreens, sealants and the like in the composition.

Preferably, the proportions of the components of the first and second mixtures are about 1 part cement to about 2 parts sand. The preferred cement is portland cement and the most preferred portland cement is white portland cement since portland cement produces the most color brilliance and requires less pigment than the darker cements. Masonry cement may be used, however, it contains lime which may weaken the resulting surface. A complete mixture of sand and cement is available from Seamco Laboratories under the trademark "FLO-CRETE."

The aqueous solutions of acrylic resins are readily available from Union Carbide available under the trademarks "UCAR 503", "UCAR 380" and "UCAR 505" and from Rohm and Haas available under the trademarks "RHOPLEX AC64", "AC 490" and "AC 507".

The colorants are readily available from Nuodix, G P Colortund, Universal Color Dispersion Co., Cardinal Color Co. and UCD Universal Colorant and from other suppliers known in the art.

The sand and cement are mixed with the aqueous solution of the resin in a ratio of about 10 pounds of resin solution to about 50 pounds of sand and cement mix which gives a fluid consistency or flowability of a thick pancake batter to the mortar. If the mortar has a greater flowability (less viscous) the resultant coating has a smoother texture. If the mortar has less flowability (more viscous) the resultant coating has a courser texture. The mortar, which may include a colorant, is completely mixed to insure complete dispersion of the ingredients such that the resulting mortar will pour or spray without separation of the ingredients.

By way of example and for illustration the process for covering an existing concrete slab, such as a driveway, includes cleaning the surface of the concrete slab by degreasing and preparing the surface for bonding by applying an acid-etching solution to the surface of the concrete. An aqueous solution of hydrofluoric acid is preferred. This solution is diluted with water up to about 3:1 (water to acid), or used full strength, and evenly applied to the slab surface in a manner well known to those in the art. The spent acid solution is then washed off by spray washing the surface with water, forced upon the surface under combined water and air pressure to provide an enhanced cleansing action upon the surface. The first liquid mortar may be applied to the surface of the concrete while it is still damp thereby enhancing the bonding between the concrete and the mortar. The mortar may also be applied to a dry surface.

Portland cement, preferably white portland cement, and sand, specifically mortar sand which is a very fine powder-like sand, is mixed at the preferred ratio of 2 parts sand to 1 part cement forming a first mixture. A second mixture is prepared the same way as the first except that a contrasting color pigment, for example black, is added to contrast the second mixture. An aqueous solution of acrylic resin is then added at a ratio of about 10 pounds of resin solution to about 50 pounds of sand and cement mix to both the first and second mixtures to prepare a first and second liquid mortar, respectively.

The first liquid mortar is sprayed onto the concrete surface using a Kraft Texture Gun, at about 15 psi pressure, which mixes the mortar and air producing a textured coat, designated the first coating, of the first liquid mortar over the entire surface of the concrete slab. The resultant sprayed surface or coat may be best described as a plurality of separate "plateaus" upon a flat lower region. This coat is known as the lower layer.

Prior to the complete curing of the first liquid mortar the second liquid and pigment containing mortar is then randomly sprayed onto the concrete surface using a Kraft Texture Gun. The second liquid mortar is preferably applied at a higher pressure, about 20-22 psi, than the first liquid mortar to enhance blending and commingling. This coat, designated the second coating, may be best described as a plurality of overlying "plateaus" randomly placed upon the previously applied first coat or liquid mortar. The second liquid mortar "plateaus" fall upon the sprayed first coat at: (1) "plateaus" of the first coat, (2) flat lower region of the first coat, and (3) partially on the "plateaus" and partially on the flat lower region of the first coat. Only those "plateaus" of the second liquid mortar which are resting upon the the "plateaus" of the first liquid mortar are considered comprising the upper layer.

The contrasting pigments are allowed to commingle with the non-pigmented areas indicated by a blending about the periphery or boundary of the pigmented and non-pigmented areas. Blending occurs in both the lower area and upper area. Since temperature and humidity influence the curing rate, the greatest extent of blending is achieved at low temperature and high humidity.

Substantially, only the resultant blended upper layer is lightly troweled to reveal blended-streaky alterations of light and dark to simulate a textured marble surface. After the simulated marble surface is completely cured the marble surface is coated with an epoxy based coating.

The simulated marble surface may be coated with a protectant coating, such as an epoxy based coating, as soon as the applied surface hardens or cures. While the time for curing is dependant upon temperature and humidity, generally about 20 minutes after trowelling is sufficient.

PINK-WHITE SIMULATED TEXTURED MARBLE SURFACE

White portland cement, and mortar sand were mixed at the preferred ratio of 2 parts sand to 1 part cement to form a first mixture. A second mixture was prepared the same way as the first except that a pink color pigment (AQI 2199 red oxide Cardinal Color Co.) was added to second mixture at about 1 fluid ounce (by volume) for each 50 pounds sand and cement mix prepared. An aqueous solution of acrylic resin was added at a ratio of about 10 pounds of resin solution to about 50 pounds of sand and cement mix to both the first and second mixtures to prepare a first and second liquid mortar, respectively.

The first liquid mortar is sprayed onto the concrete surface using a Kraft Texture Gun, at about 15 psi and an air tip bore of 3/32 inch, which mixes the mortar and air producing a textured coat, designated the first coating, of the first liquid mortar over the entire surface of the wood test piece. Prior to the complete curing of the first liquid mortar, the second liquid pink pigment containing mortar was randomly sprayed onto the coated wood surface using a Kraft Texture Gun at about 20-22 psi and an air tip bore of ⅛ inch. The pink pigment was allowed to commingle with the non-pigmented areas for about 5 minutes. The upper layer was lightly troweled to reveal the blended-streaky alterations of light and pink to simulate a textured marble surface. About 20-23 minutes after the troweling was complete, the surface was cured enough to be coated with one coating of an epoxy based coating.

BLACK-WHITE SIMULATED TEXTURED MARBLE SURFACE

White portland cement, and mortar sand were mixed at the preferred ratio of 2 parts sand to 1 part cement to form a first mixture. A second mixture was prepared the same way as the first except that a black color pigment (AQI 9104 black iron oxide Cardinal Color Co.) was added to second mixture at about 1 fluid ounce (by volume) for each 50 pounds sand and cement mix prepared. An aqueous solution of acrylic resin was added at a ratio of about 10 pounds of resin solution to about 50 pounds of sand and cement mix to both the first and second mixtures to prepare a first and second liquid mortar, respectively.

The first liquid mortar is sprayed onto the concrete surface using a Kraft Texture Gun, at about 15 psi and an air tip bore of 3/32 inch, which mixes the mortar and air producing a textured coat, designated the first coating, of the first liquid mortar over the entire surface of the wood test piece. Prior to the complete curing of the first liquid mortar, the second liquid pink pigment containing mortar was randomly sprayed onto the coated wood surface using a Kraft Texture Gun at about 20-22 psi, and an air tip bore of ¼ inch. The black pigment was allowed to commingle with the non-pigmented areas for about 5 minutes. The upper layer was lightly troweled to reveal the blended-streaky alterations of light and gray-black to simulate a textured marble surface. About 20-23 minutes after the troweling was complete, the surface was cured enough to be coated with one coating of an epoxy based coating.

The present disclosure includes that contained in the appended claims as well a that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A process for covering a substrate with a simulated marble surface comprising:
   mixing cement and sand to form a first mixture;
   adding an aqueous solution of an acrylic resin to the first mixture to create a first liquid mortar;
   mixing cement and sand to form a second mixture;
   adding an aqueous solution of an acrylic resin to the second mixture to create a second liquid mortar;
   adding and mixing a contrasting pigment to one of the first and second mortars such that the first and second mortars have contrasting colors;
   applying the first liquid mortar onto the substrate to form a first textured coat on the substrate;
   applying the second liquid mortar onto randomly spaced portions of the first coating prior to the complete curing of the first coating enabling the first and second coatings to form a unitary textured covering for the substrate with the contrasting pigment being randomly spaced in the textured unitary covering with the textured unitary coating having a lower layer and an upper layer with the lower layer comprising the first and second liquid mortars and the upper layer comprising the second liquid mortar;
   allowing the contrasting pigment in the one of the first and second liquid mortars to commingle with the other of the first and second liquid mortars to enable the pigmented areas to blend with the non-pigmented areas; and
   lightly troweling substantially only the blended upper layer of the unitary textured covering on the substrate to simulate a marble surface.

2. The process of claim 1 wherein the first and second mortars are applied by spraying.

3. The process of claim 2 wherein the first mortar is sprayed through a small bore aperture to provide a fine textured appearance and the second mortar is sprayed through a larger bore aperture to provide a coarse textured appearance.

4. The process of claim 1 including applying a clear coating to seal and protect the simulated marble surface against accelerated aging caused by sun and water.

5. A process as in claim 4 wherein the clear coating is selected from the group consisting of acrylics, epoxides, and urethanes.

6. The process of claim 1 wherein the substrate selected from the group consisting of concrete, wood, hardboard and masonry.

7. The process of claim 6 wherein the concrete is acid-etched prior to applying the first mixture in order to provide bonding between the concrete substrate and the first liquid mortar of the lower layer.

8. The process of claim 6 wherein the masonry is acid-etched prior to applying the first mixture in order to provide bonding between the masonry substrate and the first liquid mortar of the lower layer.

9. The process of claim 7 wherein the acid used to etch the substrate is hydrofluoric acid.

10. The process of claim 1 wherein the cement used to prepare the first and second mixtures is white portland cement.

11. The process of claim 1 wherein the contrasting pigment is added and mixed to the second mortar.

* * * * *